United States Patent
Korl et al.

(10) Patent No.: US 12,226,867 B2
(45) Date of Patent: *Feb. 18, 2025

(54) METHOD FOR SETTING MORE PRECISELY A POSITION AND/OR ORIENTATION OF A DEVICE HEAD

(71) Applicant: Hilti Aktiengesellschaft, Schaan (LI)

(72) Inventors: Sascha Korl, Buchs (CH); Abel Gawel, Greifensee (CH); Hermann Blum, Zurich (CH); Timothy Sandy, Zurich (CH); Marco Hutter, Flawil (CH); Roland Siegwart, Schwyz (CH)

(73) Assignee: Hilti Aktiengesellschaft, Schaan (LI)

( * ) Notice: Subject to any disclaimer, the term of this patent is extended or adjusted under 35 U.S.C. 154(b) by 337 days.

This patent is subject to a terminal disclaimer.

(21) Appl. No.: 17/763,047

(22) PCT Filed: Sep. 23, 2020

(86) PCT No.: PCT/EP2020/076575
§ 371 (c)(1),
(2) Date: Mar. 23, 2022

(87) PCT Pub. No.: WO2021/058569
PCT Pub. Date: Apr. 1, 2021

(65) Prior Publication Data
US 2022/0410329 A1    Dec. 29, 2022

(30) Foreign Application Priority Data
Sep. 24, 2019    (EP) .................................. 19199080

(51) Int. Cl.
*B23Q 15/12*    (2006.01)

(52) U.S. Cl.
CPC .................................. *B23Q 15/12* (2013.01)

(58) Field of Classification Search
None
See application file for complete search history.

(56) References Cited

U.S. PATENT DOCUMENTS

| | | |
|---|---|---|
| 2016/0346931 A1 | 12/2016 | Gottlieb |
| 2018/0236669 A1 | 8/2018 | Fukuda et al. |
| 2022/0365216 A1* | 11/2022 | Korl ........................ B25J 9/162 |

FOREIGN PATENT DOCUMENTS

| | | |
|---|---|---|
| DE | 10 2013 101 095 A1 | 8/2014 |
| DE | 10 2018 202 322 A1 | 8/2018 |
| WO | WO 2015/162334 A1 | 10/2015 |

OTHER PUBLICATIONS

PCT/EP2020/076575, International Search Report dated Dec. 8, 2020 (Three (3) pages).

(Continued)

*Primary Examiner* — Ryan A Jarrett
(74) *Attorney, Agent, or Firm* — Crowell & Moring LLP (57) ABSTRACT

A method for setting more precisely a position and/or an orientation of a device head in a measuring environment by a distance measuring device which has a number of M, M≥1, distance measuring sensors and which is connected to the device head. A control device is communicatively connected to the distance measuring device and an on-board sensor device. The position and/or the orientation of the device head is determined by the on-board sensor device and the position and/or the orientation of the device head determined by the on-board sensor device is set more precisely by the control device.

11 Claims, 3 Drawing Sheets

(56) References Cited

OTHER PUBLICATIONS

Gray et al., "Mobile Automated Robotic Drilling, Inspection, and Fastening", *SAE Technical Paper Series*, US, vol. 1, Sep. 17, 2013, XP055524406 (Seven (7) pages).
U.S. Patent Application, "Method for Setting More Precisely a Position and/or Orientation of a Device Head", filed Mar. 23, 2022, Inventor Sascha Korl et al.

* cited by examiner

METHOD FOR SETTING MORE PRECISELY A POSITION AND/OR ORIENTATION OF A DEVICE HEAD

BACKGROUND AND SUMMARY OF THE INVENTION

The present invention relates to a method for setting more precisely a position and/or orientation of a device head.

The automation of measurement and assembly tasks using robots is increasingly affecting the construction industry. So far, robots have mainly been used in automated assembly lines, which are characterized by fixed positions and constant conditions. In contrast to assembly lines, construction sites are spatially complex measuring environments that are constantly changing as construction progresses. For assembly tasks on the construction site, such as creating drill holes, creating slots and assembling installation equipment, accuracies in the millimeter range are required. These accuracies in the millimeter range are not achieved by known on-board sensor devices such as LiDAR sensor devices, which severely limits the possible uses of these on-board sensor devices for measuring and assembly tasks by means of robots on construction sites.

In order to maintain the required accuracies in the millimeter range, available prior-art apparatuses on construction sites use external sensor devices that are not connected to the device head on the robot. External sensor devices are designed for example as total stations; a disadvantage of these external sensor devices is that referencing between the external sensor device and the measuring environment must take place before they can be used; moreover, total stations are only suitable for determining the position and not the orientation. Alternatively, active or passive target objects, the positions and/or orientations of which are determined in advance, can be positioned in the measuring environment of the construction site, the position and/or orientation of the device head being determined using the known positions and/or orientations of the target objects. Disadvantages of the target objects is that the target objects must be positioned in the measuring environment of the construction site before the apparatus is used.

The object of the present invention is to develop an apparatus and a method with which the position and/or orientation of a device head can be determined with the required accuracy in the millimeter range. The apparatus should be arranged on the device head.

The method according to the invention for setting more precisely a position and/or orientation of a device head in a measuring environment by means of a distance measuring device and a control device is characterized by a sequence of a first, second, third and fourth step, which is carried out N times, N≥1, wherein:
- in the first step of the sequence, the device head is arranged in a measuring position in the measuring environment, with pose data being determined for the measuring position by the control device,
- in the second step of the sequence, the distance measuring sensors carry out a distance measurement and transmit their measured distance values to the control device,
- in the third step, corresponding estimated distance values are determined for the measured distance values from the geometry model of the measuring environment and the pose data for the measuring position, and
- in the fourth step, the deviations between the measured distance values and the corresponding estimated distance values are calculated and stored as error values, wherein after the Nth sequence of the first to fourth steps, the error values of the first to Nth sequences are used to carry out an error minimization (compensation calculation) for the position and/or orientation of the device head and the position and/or orientation of the device head is set more precisely by the control device.

The idea of the present invention is to first determine the position and/or orientation of the device head by means of a known on-board sensor device and then to set this position and/or orientation of the device head more precisely by means of a distance measuring device connected to the device head, a geometry model of the measuring environment and known standard procedures for the compensation calculation (e.g., method of least methods). Used for example as an on-board sensor device is a LiDAR sensor device, which is connected to the device head and which can determine the position and/or orientation of the device head with an accuracy in the centimeter range. The distance measuring device comprises at least one distance measuring sensor, multiple distance measuring sensors increasing the accuracy or reducing the number of sequences of the first to fourth steps.

The device head is arranged in N different measuring positions and the sequence of the first to fourth steps is carried out in each measuring position. In the first step of the sequence, the device head is arranged in a measuring position in the measuring environment, with pose data being determined for the measuring position by the control device. In the second step of the sequence, the distance measuring sensors carry out a distance measurement and transmit their measured distance values to the control device. In the third step, corresponding estimated distance values are determined for the measured distance values from the geometry model of the measuring environment and the pose data. The deviations between the measured distance values and the corresponding estimated distance values are calculated in the fourth step of the sequence and stored as error values. After the Nth sequence of the first to fourth steps, the error values of the first to Nth sequence are used to carry out an error minimization (compensation calculation) for the position and/or orientation of the device head and the position and/or orientation of the device head is set more precisely by the control device.

In one variant, the first sequence of the first to fourth steps is carried out in a first measuring position, the first measuring position corresponding to the position and/or orientation of the device head that was determined by means of the on-board sensor device, and the position and/or orientation of the device head that was determined by means of the on-board sensor device being used as first pose data for the first sequence. The first measuring position, in which the first sequence of the first to fourth steps is carried out, corresponds to the position and/or orientation of the device head that is to be set more precisely by means of the method according to the invention. The more precise setting takes place by using inter alia the error values of the first sequence, the more precise setting being performed when the sequence of the first to fourth steps has been carried out N times. The number of distance measuring sensors can be used to increase the number of error values that are determined in a sequence.

In an alternative variant, the sequence of the first to fourth steps is carried out twice in a first measuring position and a second measuring position, the first measuring position corresponding to the position and/or orientation of the device head determined by means of the on-board sensor device, the second measuring position being different from the first measuring position and the movement of the device head from the first measuring position into the second measuring position being recorded by a further on-board sensor device in the form of first movement data. The first measuring position, in which the first sequence of the first to fourth steps is carried out, corresponds to the position and/or orientation of the device head that is to be set more precisely by means of the method according to the invention. The greater the number N of sequences, the more error values can be used in the error minimization (compensation calculation).

The second pose data for the second measuring position are preferably determined from the first pose data of the first measuring position and the first movement data. The second pose data for the second measuring position are required in the third step of the sequence of the first to fourth steps to determine for the measured distance values corresponding estimated distance values in the geometry model of the measuring environment.

Alternatively, the second pose data for the second measuring position are determined from optimized first pose data and the first movement data, the optimized first pose data being determined from the position and/or orientation of the device head that was determined by means of the on-board sensor device, by error minimization (compensation calculation) by means of the error values of the first sequence. The aim of the method according to the invention is to set more precisely the position and/or orientation of the device head that was determined by means of the on-board sensor device.

In a further alternative variant, the sequence of the first to fourth steps is carried out at least three times, the movement of the device head from one measuring position into a new measuring position being recorded by the further on-board sensor device in the form of movement data. The first measuring position, in which the first sequence of the first to fourth steps is carried out, corresponds to the position and/or orientation of the device head that is to be set more precisely by means of the method according to the invention. The device head is moved from the first measuring position into a second measuring position, the movement of the device head from the first into the second measuring position being recorded by the further on-board sensor device as first movement data, and the device head is moved from the second measuring position into a third measuring position, the movement from the second into the third measuring position being recorded by the further on-board sensor device as second movement data.

The pose data for the new measuring position are preferably determined from the first pose data of the first measuring position and the movement data. The pose data for the new measuring position are required in the third step of the sequence of the first to fourth steps to determine corresponding estimated distance values for the measured distance values in the geometry model of the measuring environment.

Alternatively, the pose data for the new measuring position are determined from optimized first pose data and the movement data, the optimized first pose data being determined from the position and/or orientation of the device head that was determined by means of the on-board sensor device, by error minimization (compensation calculation) by means of the error values of the sequences carried out in the first to fourth steps. The further on-board sensor device, which is connected to the device head, records the movement of the device head between all measuring positions.

In a further development of the method, within error minimization (compensation calculation) an error measure is determined after the Nth sequence of the first to fourth steps. This error measure evaluates the quality or accuracy with which the position and/or orientation of the device head is set more precisely.

The error measure is preferably compared with a maximum error, wherein, for the case where the error measure is greater than the maximum error, the device head is moved into a new measuring position and the sequence of the first to fourth steps is carried out for the new measuring position. The sequence of the first to fourth steps is carried out until the position and/or orientation of the device head has been set more precisely with the required quality or accuracy.

The present invention also relates to an apparatus for setting more precisely a position and/or orientation of a device head by means of the method of the present invention. The position and/or orientation of the device head is first determined by means of a known on-board sensor device and this position and/or orientation of the device head is then set more precisely by means of the apparatus according to the invention.

The apparatus preferably has a distance measuring device, which comprises a number of M, M≥1 distance measuring sensors and which is connected to the device head, and a control device, which is connected in a communicating manner to the distance measuring device and an on-board sensor device connected to the device head. The distance measuring device comprises one or more distance measuring sensors, the measuring directions of which differ from one another. A larger number of distance measuring sensors increases the accuracy, or the number of sequences of the first to fourth steps can be reduced.

The apparatus particularly preferably has a further on-board sensor device, which is attached to the device head and which is connected in a communicating manner to the control device. The further on-board sensor device records the movement of the device head from one measuring position into a new measuring position in the form of movement data, which are transmitted to the control device.

Exemplary embodiments of the invention are described hereinafter with reference to the drawings. It is not necessarily intended for this to illustrate the exemplary embodiments to scale; instead, where useful for explanation, the drawings are produced in a schematic and/or slightly distorted form. With regard to additions to the teachings that can be seen directly from the drawings, reference is made to the relevant prior art. It should be taken into account here that various modifications and variations relating to the form and the detail of an embodiment may be undertaken without departing from the general concept of the invention. The features of the invention disclosed in the description, the drawings and the claims can be essential for the development of the invention both individually and in any combination. In addition, all combinations of at least two of the features disclosed in the description, the drawings and/or the claims fall within the scope of the invention. The general concept of the invention is not limited to the exact form or the detail of the preferred embodiment shown and described hereinafter or limited to subject matter that would be limited compared to the subject matter claimed in the claims. For given dimensioning ranges, values within the stated limits should also be disclosed as limit values and can be used and claimed as desired. For the sake of simplicity, identical reference signs are used hereinafter for identical or similar parts or parts having identical or similar functions.

DETAILED DESCRIPTION OF THE DRAWINGS

Figure 1:
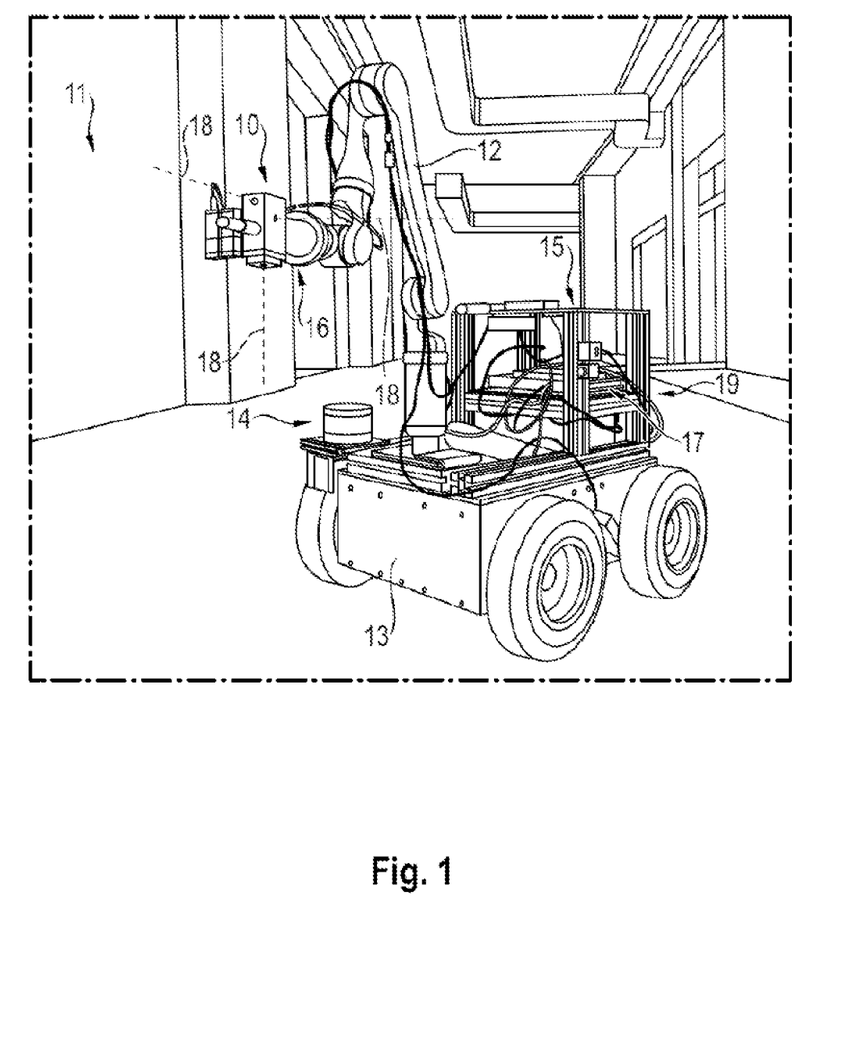
FIG. 1 shows a device head, the position and/or orientation of which in a measuring environment is to be set more precisely by means of an apparatus according to the invention.

FIG. 1 shows a device head 10, the position and/or orientation of which in a measuring environment 11 is to be determined with an accuracy in the millimeter range. The term "device head" includes all processing heads, assembly heads and measuring heads intended for carrying out processing, assembly or measuring tasks. The device head 10 may for example be formed as a grinding head, welding head, drilling head or detector head.

In the exemplary embodiment, the device head 10 is connected to a robot arm 12 which is mounted on a work platform 13. The robot arm 12 is designed as a multi-axis robot arm with multiple axes of rotation and the work platform 13 can be adjusted in one plane via motor-driven wheels that are mounted on two axes. The robot arm 12 consists of multiple rigid members that are connected by swivel joints or sliding joints, the swivel or sliding joints being able to be adjusted by controlled drives. The number of swivel or sliding joints required depends on the type of device head 10 and the planned application.

By combining the robot arm 12 with the work platform 13, the spatial area of the device head 10 can be increased in size. The work platform 13 makes it possible to position the device head 10 mounted on the robot arm 12 at least approximately in the measuring environment 11, the approximate positioning taking place in two dimensions in the plane. Instead of the motor-adjustable work platform 13, the robot arm 12 may be mounted on a manually adjustable work platform. A motor-adjustable work platform 13 allows the device head 10 to be positioned without an operator, whereas a manually adjustable work platform 13 has to be adjusted by the operator. Instead of the adjustable work platform 13, the robot arm 12 may be connected to a standing foot that allows the robot arm 12 to stand securely; the standing foot can be adjusted by the operator in order to increase the size of the spatial area. In principle, the device head 10 can also be used without a robot arm and/or work platform. The number of degrees of freedom of the device head 10 can vary greatly and is dependent on the type of device head 10 and the planned application. The device head 10 may be adjustable in one or more directions of translation, in one or more directions of rotation or in a combination of directions of translation and directions of rotation.

The position and/or orientation of the device head 10 is determined by means of an on-board sensor device 14 and then set more precisely by means of an apparatus 15 for setting more precisely the position and/or orientation of the device head 10. The apparatus 15 comprises a distance measuring device 16 and a control device 17, which is connected in a communicating manner to the on-board sensor device 14 and to the distance measuring device 16. The on-board sensor device 14 is used to determine the position and/or orientation of the device head 10; a LiDAR sensor device may be used for example as the on-board sensor device 14. The distance measuring device 16 comprises a number of M, M≥1 distance measuring sensors 18, the measuring directions of which differ from one another. In the exemplary embodiment, the distance measuring device 16 has three distance measuring sensors 18, which are arranged at right angles to one another. The distance measuring device 16 is connected to the device head 10 and serves to set more precisely the position and/or orientation of the device head 10 that was determined by means of the on-board sensor device 14.

In order to set the position and/or orientation of the device head 10 more precisely, the device head 10 is arranged in different measuring positions, in which the distance measuring sensors 18 of the distance measuring device 16 carry out a distance measurement. The movement of the device head 10 from one measuring position into a new measuring position is recorded by a further on-board sensor device 19, which is connected to the device head 10, in the form of movement data; the further on-board sensor device 19 is formed for example as an acceleration sensor.

Figure 2:
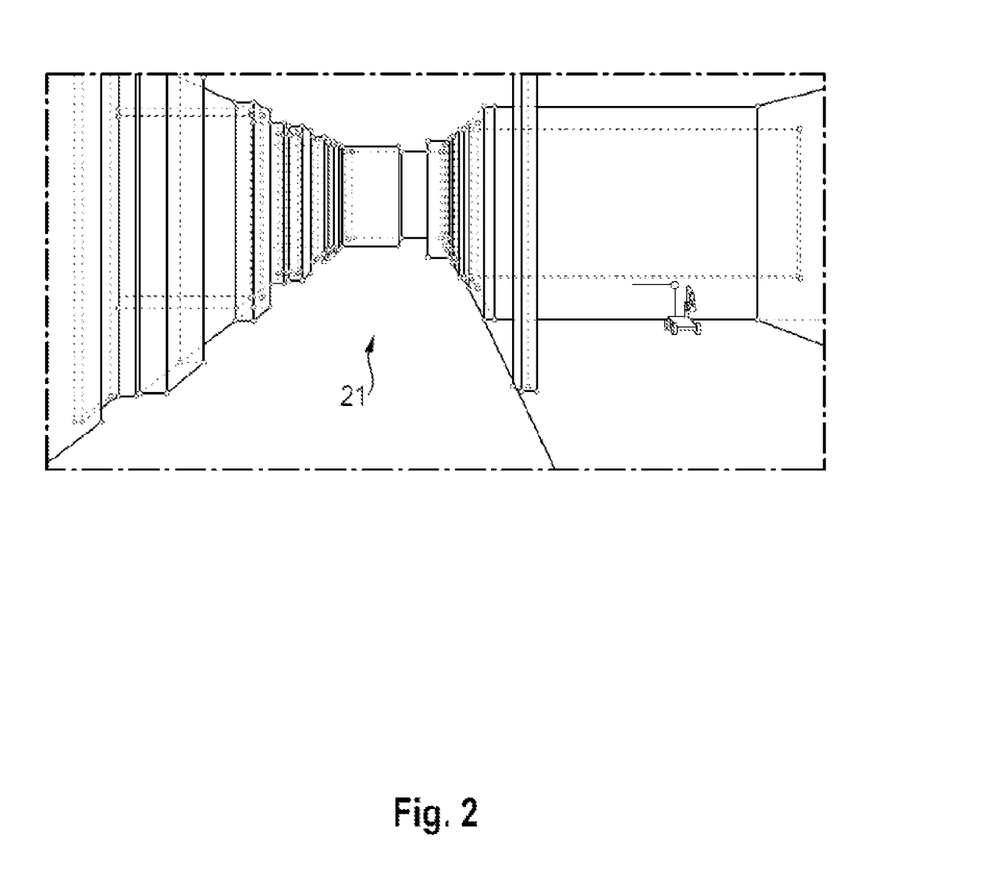
FIG. 2 shows a geometry model of the measuring environment in which the position and/or orientation of the device head is to be set more precisely.

The measuring environment 11 is mapped in a geometry model 21 which is shown in FIG. 2. The geometry model 21 depicts the objects of the measuring environment 11 that form boundary surfaces and allows the distances between the device head 10 and the boundary surfaces to be estimated. The distances are estimated in the directions which correspond to the measuring directions of the distance measuring sensors 18. For example, a construction model of the measuring environment 11 produced with CAD support can be used as the geometry model 21. Alternatively, the measuring environment 11 may be scanned by means of a laser scanner and a geometry model of the measuring environment 11 is created from the scan data. The geometry model 21 may map the measuring environment 11 completely or only partially. The surfaces of the measuring environment 11 that are used as a reflection surface or scatter surface for a distance measurement are decisive for the present application. The estimated distance values that are compared with the measured distance values are determined from the geometry model 21 by means of known ray tracing methods.

The method according to the invention for setting more precisely the position and/or orientation of the device head 10 is characterized by a sequence of a first, second, third and fourth step, which is carried out at least once, preferably multiple times (N times). The device head 10 is arranged in N, N≥1 different measuring positions and the sequence of the first to fourth steps is carried out in each measuring position. In the exemplary embodiment, the sequence of the first, second, third and fourth steps is carried out three times. The device head 10 is arranged in the measuring environment 11 in three measuring positions, which are referred to as the first measuring position $MP_1$ (FIG. 3A), second measuring position $MP_2$ (FIG. 3B) and third measuring position $MP_3$ (FIG. 3C).

Figure 3A:
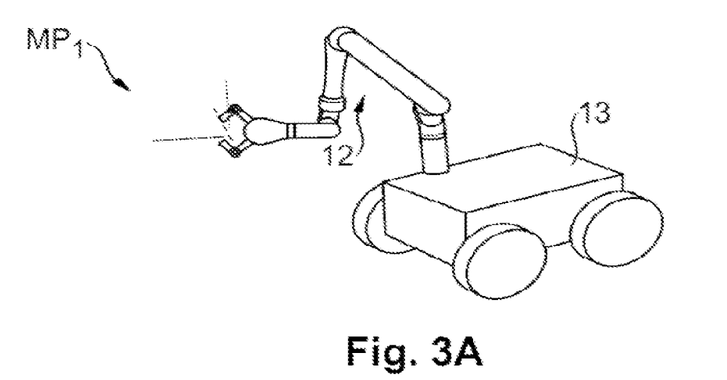
FIGS. 3A-C show the device head of FIG. 1 in a first measuring position (FIG. 3A), a second measuring position (FIG. 3B) and a third measuring position (FIG. 3C).

In the first step of the first sequence, the device head 10 is arranged in the measuring environment 11 in the first measuring position $MP_1$ (FIG. 3A). The first measuring position $MP_1$ corresponds to the position and/or orientation of the device head 10 that is to be set more precisely by means of the apparatus 15. For the first measuring position $MP_1$, first pose data are determined, the position and/or orientation of the device head 10 that was determined by means of the on-board sensor device 14 being used as first pose data. In the second step of the first sequence, the distance measuring sensors 18 carry out a distance measurement and transmit their measured distance values $d_{m\_}j1$ for $j=1 \ldots M$ to the control device 17; in the exemplary embodiment, the three distance measuring sensors 18 determine three measured distance values $d_{m\_}11$, $d_{m\_}12$, $d_{m\_}31$. For the first measuring position $MP_1$, in the third step of the first sequence, the geometry model 21 is used to determine for the measured distance values $d_{m\_}j1$ corresponding estimated distance values $d_{e\_}j1$ for $j=1 \ldots M$; in the exemplary embodiment, three estimated distance values $d_{e\_}11$, $d_{e\_}21$, $d_{e\_}31$ are determined. In the fourth step of the first sequence, the deviations $\Delta_{j1}$ for $j=1 \ldots M$ between the measured distance values $d_{m\_}j1$ and the corresponding estimated distance values $d_{e\_}j1$ are calculated and stored as error values; in the exemplary embodiment, the first sequence produces three error values $\Delta_{11}, \Delta_{21}, \Delta_{31}$.

Figure 3B:
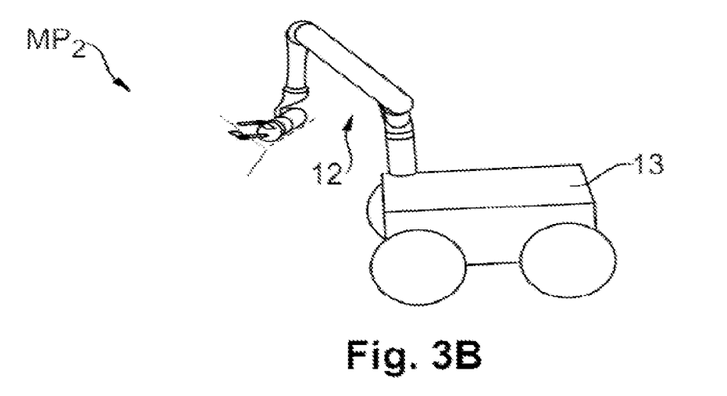
Figure 3C:
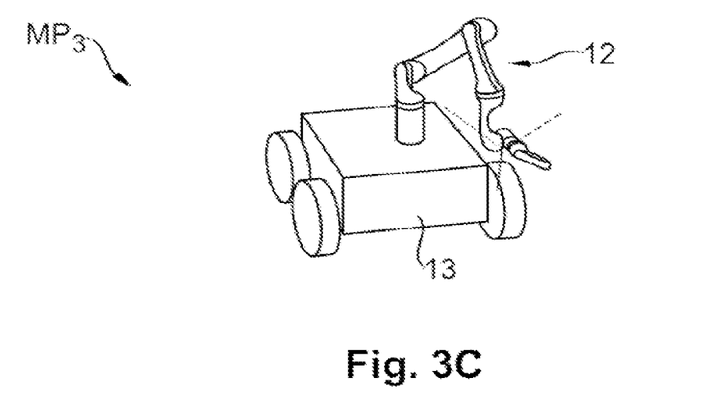

After completion of the first sequence of the first to fourth steps, in the first step of the second sequence the device head 10 is moved from the first measuring position $MP_1$ into the second measuring position $MP_2$ (FIG. 3B). The movement of the device head 10 from the first measuring position $MP_1$ into the second measuring position $MP_2$ is recorded by the further on-board sensor device 19 in the form of first movement data.

The second pose data of the second measuring position $MP_2$ may be determined from the first pose data of the first measuring position $MP_1$ and the first movement data. Alternatively, the second pose data of the second measuring position $MP_2$ may be determined from optimized first pose data and the first movement data. For this purpose, the error values $\Delta_{11}, \Delta_{21}, \Delta_{31}$ of the first sequence are used to carry out a compensation calculation for the position and/or orientation of the device head 10, which is referred to as error minimization, and the result of this compensation calculation gives the optimized first pose data.

In the second step of the second sequence, the distance measuring sensors 18 carry out a distance measurement and transmit their measured distance values $d_{m\_}j2$ for $j=1 \ldots M$ to the control device 17; in the exemplary embodiment, the three distance measuring sensors 18 determine three measured distance values $d_{m\_}12$, $d_{m\_}22$, $d_{m\_}32$. For the second measuring position $MP_2$ in the third step of the second sequence the geometry model 21 is used to determine for the measured distance values $d_{m\_}j2$ corresponding estimated distance values $d_{e\_}j2$ for $j=1 \ldots M$; in the exemplary embodiment, three estimated distance values $d_{e\_}12$, $d_{e\_}22$, $d_{e\_}32$ are determined. In the fourth step of the second sequence, the deviations $\Delta_{j2}$ for $j=1 \ldots M$ between the measured distance values $d_{m\_}j2$, $j=1 \ldots M$ and the corresponding estimated distance values $d_{e\_}j2$, $j=1 \ldots M$ are calculated and stored as error values; in the exemplary embodiment, the second sequence produces three error values $\Delta_{12}, \Delta_{22}, \Delta_{32}$.

After completion of the second sequence of the first to fourth steps, in the first step of the third sequence the device head 10 is moved from the second measuring position $MP_2$ into the third measuring position $MP_3$ (FIG. 3C). The movement of the device head 10 from the second measuring position $MP_1$ into the third measuring position $MP_3$ is recorded by the further on-board sensor device 19 in the form of second movement data.

The third pose data of the third measuring position $MP_3$ may be determined from the first pose data of the first measuring position $MP_1$ and the first and second movement data. Alternatively, the third pose data of the third measuring position $MP_3$ may be determined from optimized first pose data and the first and second movement data. For this purpose, the error values $\Delta_{11}, \Delta_{21}, \Delta_{31}$ of the first sequence and $\Delta_{12}, \Delta_{22}, \Delta_{32}$ of the second sequence are used to carry out a compensation calculation for the position and/or orientation of the device head 10 (error minimization), and the result of this compensation calculation gives the optimized first pose data.

In the second step of the third sequence, the distance measuring sensors 18 carry out a distance measurement and transmit their measured distance values $d_{m\_}j3$ for $j=1 \ldots M$ to the control device 17; in the exemplary embodiment, the three distance measuring sensors 18 determine three measured distance values $d_{m\_}13$, $d_{m\_}23$, $d_{m\_}33$. For the third measuring position $MP_3$, in the third step of the third sequence the geometry model 21 is used to determine for the measured distance values $d_{m\_}j3$ corresponding estimated distance values $d_{e\_}j3$ for $j=1 \ldots M$; in the exemplary embodiment, three estimated distance values $d_{e\_}13$, $d_{e\_}23$, $d_{e\_}33$ are determined. In the fourth step of the third sequence, the deviations $\Delta_{j3}$ for $j=1 \ldots M$ between the measured distance values $d_{m\_}j3$ and the corresponding estimated distance values $d_{e\_}j3$ are calculated and stored as error values; in the exemplary embodiment, the third sequence produces three error values $\Delta_{13}, \Delta_{23}, \Delta_{33}$.

After completion of the third sequence of the first, second, third and fourth steps, the control device 17 uses the error values of the first sequence $\Delta_{11}, \Delta_{21}, \Delta_{31}$, the error values of the second sequence $\Delta_{12}, \Delta_{22}, \Delta_{32}$ and the error values of the third sequence $\Delta_{13}, \Delta_{23}, \Delta_{33}$ to carry out a compensation calculation for the position and/or orientation of the device head 10 (error minimization). The compensation calculation is performed for example by means of the method of least squares. The more precisely set position and/or orientation of the device head 10 results from the compensation calculation.

In a further development of the method, after the Nth sequence of the first to fourth steps, the control device 17 determines within the compensation calculation an error measure $\delta$, which indicates the quality or accuracy with which the position and/or orientation of the device head 10 is set more precisely. The error measure $\delta$ is compared with a maximum error $\delta_{max}$, which indicates the allowed inaccuracy. If the error measure $\delta$ is greater than the maximum error $\delta_{max}$, the device head 10 is moved from the third measuring position $MP_3$ into a new measuring position, in which the sequence of the first to fourth steps is carried out again; the new measuring position is referred to as the fourth measuring position $MP_4$. The movement of the device head 10 from the third measuring position $MP_3$ into the fourth measuring position $MP_4$ is recorded in the form of third movement data by the further on-board sensor device 19.

In a further development of the method according to the invention, the quality of the error values $\Delta_{ji}$ that are determined in the sequences can be evaluated by the control device 17 by means of suitable calculation methods, and error values of poor quality can be given a lower weighting or be disregarded in the compensation calculation (error minimization) which is carried out after the last sequence of the first to fourth steps. Strong deviations between the measured distance values and the corresponding estimated distance values may occur if the distance measuring sensors 18 are directed at edges in the measuring environment 11, since even small angular deviations can lead to large changes in the measured distance values.

The invention claimed is:

1. A method for setting more precisely a position and/or an orientation of a device head (10) in a measuring environment (11) by a distance measuring device (16) which comprises a number of M, M≥1, distance measuring sensors (18) and which is connected to the device head (10), and a control device (17) which is communicatively connected to the distance measuring device (16) and an on-board sensor device (14), comprising the steps of:

determining the position and/or the orientation of the device head (10) by the on-board sensor device (14) and transmitting the position and/or the orientation of the device head (10) determined by the on-board sensor device (14) to the control device (17);

a sequence of a first step, a second step, a third step, and a fourth step which is carried out N times, N≥1, wherein:

in the first step of the sequence, the device head (10) is arranged in a measuring position ($MP_1$, $MP_2$, $MP_3$) in the measuring environment (11) with pose data being determined for the measuring position ($MP_1$, $MP_2$, $MP_3$);

in the second step of the sequence, the distance measuring sensors (18) carry out a distance measurement and transmit respective measured distance values ($d_{m\_}j1$, $d_{m\_}j2$, $d_{m\_}j3$) to the control device (17);

in the third step of the sequence, a geometry model (21) of the measuring environment (11) stored in the control device (17) and the pose data for the measuring position ($MP_1$, $MP_2$, $MP_3$) are used to determine for the measured distance values ($d_{m\_}j1$, $d_{m\_}j2$, $d_{m\_}j3$) corresponding estimated distance values ($d_{e\_}j1$, $d_{e\_}j2$, $d_{e\_}j3$); and in the fourth step of the sequence, deviations ($\Delta_{j1}$, $\Delta_{j2}$, $\Delta_{j3}$) between the measured distance values ($d_{m\_}j1$, $d_{m\_}j2$, $d_{m\_}j3$) and the corresponding estimated distance values ($d_{e\_}j1$, $d_{e\_}j2$, $d_{e\_}j3$) are calculated and stored as error values ($\Delta_{j1}$, $\Delta_{j2}$, $\Delta_{j3}$); and after a Nth sequence of the first to fourth steps, the error values ($\Delta_{j1}$, $\Delta_{j2}$, $\Delta_{j3}$) are used to carry out an error minimization for the position and/or the orientation of the device head (10) and the position and/or the orientation of the device head (10) determined by the on-board sensor device (14) is set more precisely by the control device (17);

wherein the sequence of the first to fourth steps is carried out twice in a first measuring position ($MP_1$) and a second measuring position ($MP_2$), wherein the first measuring position ($MP_1$) corresponds to the position and/or the orientation of the device head (10) that is determined by the on-board sensor device (14), wherein the second measuring position ($MP_2$) is different from the first measuring position ($MP_1$), and wherein a movement of the device head (10) from the first measuring position ($MP_1$) into the second measuring position ($MP_2$) is recorded by a further on-board sensor device (19) in a form of first movement data.

2. The method as claimed in claim 1, wherein the position and/or the orientation of the device head (10) that is determined by the on-board sensor device (14) is used as the first pose data for the first sequence.

3. The method as claimed in claim 1, wherein the second pose data for the second measuring position ($MP_2$) are determined from the first pose data of the first measuring position ($MP_1$) and the first movement data.

4. The method as claimed in claim 1, wherein the second pose data for the second measuring position ($MP_2$) are determined from optimized first pose data and the first movement data and wherein the optimized first pose data is determined from the position and/or the orientation of the device head (10) that is determined by the on-board sensor device (14) by error minimization by the error values ($\Delta_{j1}$) of the first sequence.

5. A method for setting more precisely a position and/or an orientation of a device head (10) in a measuring environment (11) by a distance measuring device (16) which comprises a number of M, M≥1, distance measuring sensors (18) and which is connected to the device head (10), and a control device (17) which is communicatively connected to the distance measuring device (16) and an on-board sensor device (14), comprising the steps of:

determining the position and/or the orientation of the device head (10) by the on-board sensor device (14) and transmitting the position and/or the orientation of the device head (10) determined by the on-board sensor device (14) to the control device (17);

a sequence of a first step, a second step, a third step, and a fourth step which is carried out N times, N≥1, wherein:

in the first step of the sequence, the device head (10) is arranged in a measuring position ($MP_1$, $MP_2$, $MP_3$) in the measuring environment (11) with pose data being determined for the measuring position ($MP_1$, $MP_2$, $MP_3$);

in the second step of the sequence, the distance measuring sensors (18) carry out a distance measurement and transmit respective measured distance values ($d_{m\_}j1$, $d_{m\_}j2$, $d_{m\_}j3$) to the control device (17);

in the third step of the sequence, a geometry model (21) of the measuring environment (11) stored in the control device (17) and the pose data for the measuring position ($MP_1$, $MP_2$, $MP_3$) are used to determine for the measured distance values ($d_{m\_}j1$, $d_{m\_}j2$, $d_{m\_}j3$) corresponding estimated distance values ($d_{e\_}j1$, $d_{e\_}j2$, $d_{e\_}j3$); and in the fourth step of the sequence, deviations ($\Delta_{j1}$, $\Delta_{j2}$, $\Delta_{j3}$) between the measured distance values ($d_{m\_}j1$, $d_{m\_}j2$, $d_{m\_}j3$) and the corresponding estimated distance values ($d_{e\_}j1$, $d_{e\_}j2$, $d_{e\_}j3$) are calculated and stored as error values ($\Delta_{j1}$, $\Delta_{j2}$, $\Delta_{j3}$); and after a Nth sequence of the first to fourth steps, the error values ($\Delta_{j1}$, $\Delta_{j2}$, $\Delta_{j3}$) are used to carry out an error minimization for the position and/or the orientation of the device head (10) and the position and/or the orientation of the device head (10) determined by the on-board sensor device (14) is set more precisely by the control device (17);

wherein the sequence of the first to fourth steps is carried out at least three times with movement of the device head (10) from one measuring position ($MP_1$, $MP_2$) into a new measuring position ($MP_2$, $MP_3$) being recorded by a further on-board sensor device (19) in a form of movement data.

6. The method as claimed in claim 5, wherein pose data for the new measuring position ($MP_2$, $MP_3$) are determined from first pose data of the first measuring position ($MP_1$) and the movement data.

7. The method as claimed in claim 5, wherein the pose data for the new measuring position ($MP_2$, $MP_3$) are determined from optimized first pose data and the movement data, wherein the optimized first pose data is determined from the position and/or the orientation of the device head (10) that is determined by the on-board sensor device (14) by error minimization by the error values ($\Delta_{j1}$, $\Delta_{j2}$) of the sequences of the first to fourth steps carried out.

8. A method for setting more precisely a position and/or an orientation of a device head (10) in a measuring environment (11) by a distance measuring device (16) which comprises a number of M, M≥1, distance measuring sensors (18) and which is connected to the device head (10), and a control device (17) which is communicatively connected to the distance measuring device (16) and an on-board sensor device (14), comprising the steps of:

- determining the position and/or the orientation of the device head (10) by the on-board sensor device (14) and transmitting the position and/or the orientation of the device head (10) determined by the on-board sensor device (14) to the control device (17);
- a sequence of a first step, a second step, a third step, and a fourth step which is carried out N times, N≥1, wherein:
- in the first step of the sequence, the device head (10) is arranged in a measuring position ($MP_1$, $MP_2$, $MP_3$) in the measuring environment (11) with pose data being determined for the measuring position ($MP_1$, $MP_2$, $MP_3$);
- in the second step of the sequence, the distance measuring sensors (18) carry out a distance measurement and transmit respective measured distance values ($d_{m\_}j1$, $d_{m\_}j2$, $d_{m\_}j3$) to the control device (17);
- in the third step of the sequence, a geometry model (21) of the measuring environment (11) stored in the control device (17) and the pose data for the measuring position ($MP_1$, $MP_2$, $MP_3$) are used to determine for the measured distance values ($d_{m\_}j1$, $d_{m\_}j2$, $d_{m\_}j3$) corresponding estimated distance values ($d_{e\_}j1$, $d_{e\_}j2$, $d_{e\_}j3$); and
- in the fourth step of the sequence, deviations ($\Delta_{j1}$, $\Delta_{j2}$, $\Delta_{j3}$) between the measured distance values ($d_{m\_}j1$, $d_{m\_}j2$, $d_{m\_}j3$) and the corresponding estimated distance values ($d_{e\_}j1$, $d_{e\_}j2$, $d_{e\_}j3$) are calculated and stored as error values ($\Delta_{j1}$, $\Delta_{j2}$, $\Delta_{j3}$); and
- after a Nth sequence of the first to fourth steps, the error values ($\Delta_{j1}$, $\Delta_{j2}$, $\Delta_{j3}$) are used to carry out an error minimization for the position and/or the orientation of the device head (10) and the position and/or the orientation of the device head (10) determined by the on-board sensor device (14) is set more precisely by the control device (17);
- wherein, after the Nth sequence of the first to fourth steps, an error measure ($\delta$) is determined within the error minimization;
- wherein the error measure ($\delta$) is compared with a maximum error ($\delta_{max}$), wherein, for a case where the error measure ($\delta$) is greater than the maximum error ($\delta_{max}$), the device head (10) is moved into a new measuring position ($MP_4$) and the sequence of the first to fourth steps is carried out for the new measuring position ($MP_4$).

9. An apparatus (15) for setting more precisely a position and/or an orientation of a device head (10) which performs the method as claimed in claim 1.

10. The apparatus as claimed in claim 9, wherein the apparatus (15) has a distance measuring device (16) which comprises a number of M, M≥1, of distance measuring sensors (18) and which is connected to the device head (10), and a control device (17) which is communicatively connected to the distance measuring device (16) and an on-board sensor device (14) connected to the device head (10).

11. The apparatus as claimed in claim 10, wherein the apparatus (15) has a further on-board sensor device (19) which is attached to the device head (10) and which is communicatively connected to the control device (17).

\* \* \* \* \*